(12) United States Patent
Kosuń

(10) Patent No.: US 7,777,721 B2
(45) Date of Patent: Aug. 17, 2010

(54) COMPUTER POINTING DEVICE

(76) Inventor: Patrycjusz Kosuń, ul. Kościelna 31, 05-480 Karczew (PL)

( * ) Notice: Subject to any disclaimer, the term of this patent is extended or adjusted under 35 U.S.C. 154(b) by 1173 days.

(21) Appl. No.: 10/790,323

(22) Filed: Feb. 27, 2004

(65) Prior Publication Data

US 2005/0122307 A1 Jun. 9, 2005

(51) Int. Cl.
*G09G 5/08* (2006.01)
(52) U.S. Cl. .................... 345/157; 345/160
(58) Field of Classification Search .......... 345/156–184
See application file for complete search history.

(56) References Cited

U.S. PATENT DOCUMENTS

| | | | | |
|---|---|---|---|---|
| 5,504,502 A * | 4/1996 | Arita et al. | .................... | 345/160 |
| 6,326,948 B1 * | 12/2001 | Kobachi et al. | .............. | 345/160 |
| 6,388,655 B1 * | 5/2002 | Leung | .......................... | 345/157 |
| 6,624,805 B2 * | 9/2003 | Liu et al. | ..................... | 345/160 |
| 6,642,920 B2 * | 11/2003 | Osawa et al. | ................. | 345/169 |
| 6,646,631 B2 * | 11/2003 | Suzuki et al. | ................ | 345/157 |
| 6,667,733 B2 * | 12/2003 | Miyoshi | ..................... | 345/156 |
| 6,670,946 B2 * | 12/2003 | Endo et al. | ................... | 345/160 |
| 6,686,584 B2 * | 2/2004 | Nachtigall et al. | ........... | 250/221 |
| 6,797,896 B2 * | 9/2004 | Lee | .............................. | 200/6 A |
| 2004/0046741 A1 * | 3/2004 | Low et al. | .................... | 345/166 |

* cited by examiner

*Primary Examiner*—Regina Liang
(74) *Attorney, Agent, or Firm*—Horst M. Kasper

(57) ABSTRACT

The Invention relates to a computer input pointing device which comprises its casing (2), an upper movable steering element (3), steering element's movement detector (5a), and the system transmitting information about such movement to the computer. Such device is applicable especially in portable computers. To enhance ergonomics and the precision of steering element (3) movement as well as the comfort of its control, the steering element is supported by a bearing (21a) in the casing (2), with the possibility of two dimensional spherical movement, while the center of the spherical surface (4) defined by the movement of the steering element (3) in relation to the bearing is situated above the largest horizontal secant surface of the steering element (3).

4 Claims, 10 Drawing Sheets

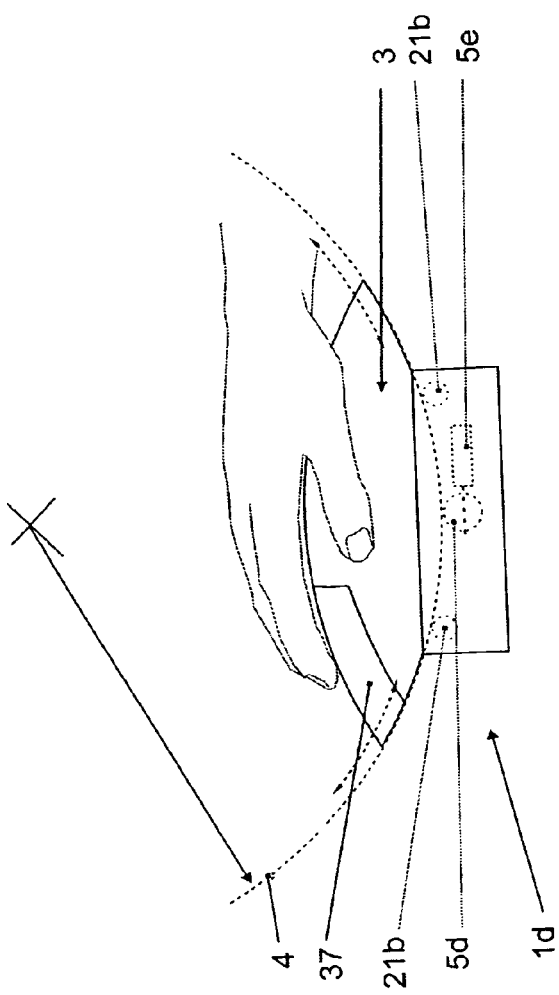
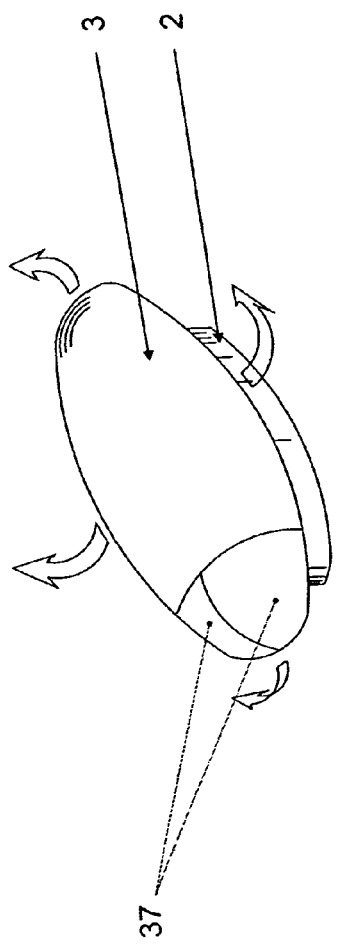
Fig. 5
Fig. 6

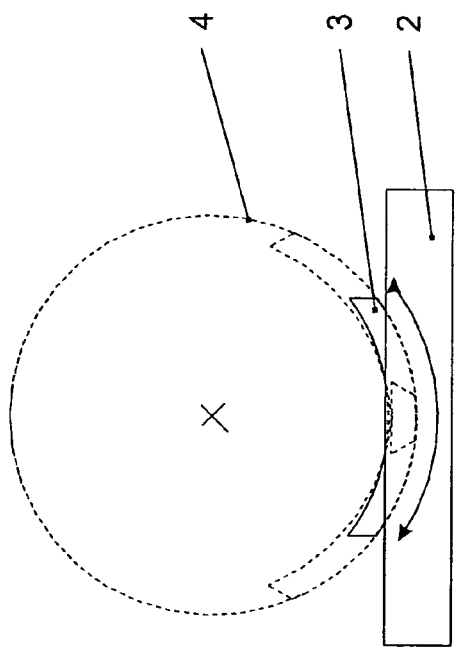
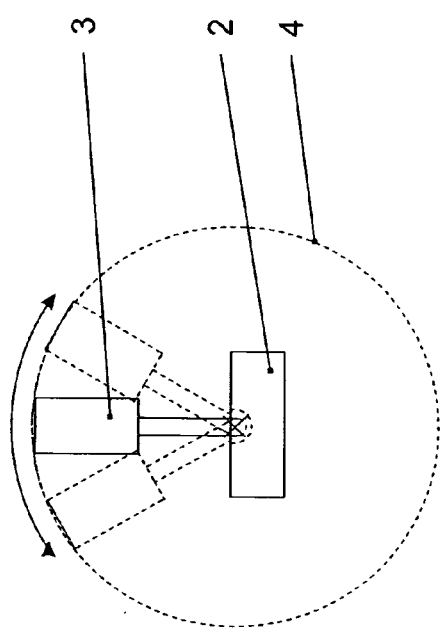
Fig. 11a
Fig. 11b (PRIOR ART)

COMPUTER POINTING DEVICE

FIELD OF THE INVENTION

The Invention relates to a computer input pointing device comprising its casing, an upper movable steering element, steering element's movement detector, and the system transmitting information about such movement to the computer. Such devices are applied to control the movement of the cursor on the computer screen while at work in graphic environment.

BACKGROUND OF THE INVENTION

The comfort of an input pointing device usage is determined by the way its steering element is relocated. The device should enable its user to make clear and free movements of the steering element by his/her hand or finger. Such movement is scanned by detecting elements—mechanical or optical ones and transformed by a relevant electronic system into an input stream of computer data. Moreover such device should be universal and particularly sensitive to differences in the dynamics of steering element's movements. It is essential that such device be as precise while moved slowly and delicately (e.g. while at work on graphics processing) as it is while moved quickly and abruptly (e.g. while controlling dynamic computer games).

The most popular of well-known computer pointing devices is a computer mouse. In principle it satisfies the requirements mentioned above. Nevertheless, the need for a flat pad on which the ball comprising the steering element moves limits its application mainly to stationary computers. The state of related technology achievements in this field provides many other devices applied in portable computers. The most popular are trackpoint devices (schematically represented in diagram FIG. 11b), touchpad or trackball (schematically represented diagram FIG. 11c), none of which requires a flat pad. Quite often though, in practical use their accuracy is small, because the movement of the steering element is performed on a small surface, it is not precise and/or not ergonomic. In many cases, due to the inert character of the steering element, it is necessary to perform a few movements in order to direct the cursor to the desired point on the screen.

The U.S. Pat. No. 6,515,650 displays a device of a completely different character. That device includes a steering element i.e. a spherical part provided at the lower end of the device; a bearing which supports said spherical part in its center which constitutes the center of the rotation movement as well; repositioning elements which rotate the said spherical part within said bearing so as to recover the upright position of the movable; part as well as inclination detecting means which detects the direction of inclination and the angle of inclination of said movable steering element.

The common feature of the devices mentioned above is the location of the spherical surface center defined by the movement of the steering element. Such devices can only perform convex movements or the movements which are parallel to their base. Due to the character of such movement, in vast majority of existing solutions it is necessary to apply arm, forearm and hand muscles to displace the steering element; hence prolonged using of such devices is tiresome.

Considering the fact that the working area of computer monitor—so called desktop—is usually positioned vertically, beginner computer users have problem how to move the cursor towards the top of the screen with the use of standard input pointing devices. It often happens that the said user attempts to lift the mouse upwards. Other pointing devices such as trackpoint, touchpad or trackball do not allow to control cursor movements according to the expectations of beginner computer users so they do not solve that problem either.

It is an object of the Invention to provide an input pointing device which, in relation to common existing solutions, allows more ergonomics and precision of steering element movement and greater comfort of its control by hand or fingers.

It is another object of the Invention to provide design of an input pointing device which makes possible its application in portable computers.

It is an additional object of the Invention to provide the design of an input pointing device where the steering element is relocated according to the expectations of beginner computer users.

SUMMARY OF THE INVENTION

The Invention relates to a computer input pointing device where the steering element is supported by a bearing in the casing, with the possibility of two dimensional movement over spherical surface, while the center of the said spherical surface defined by the movement of the steering element in relation to the bearing is situated above the largest horizontal secant surface of the steering element.

By placing the center of the spherical surface (defined by the area of possible steering element inclinations) above the largest secant surface of the steering element, it moves in a way which is concave to the device casing. The notion of "the largest horizontal secant surface" hereby refers to horizontal flat surface of the largest area cutting the solid body of the steering element and limited by the horizontal outer outline of the steering element. So that the concave part of the surface of steering element's possible inclinations in relation to the bearing, hereby referred to as "the possible inclinations'surface", is situated below the steering element, its center should be placed above the largest horizontal secant surface, in the central part of the device. Placing this center on the level of such surface (as it is the case of trackball device, drawing FIG. 11c), or below (for instance in devices such as trackpoint or steering lever, drawing FIG. 11b) leads to the type of inclination movement, which is common in related technology solutions.

Thanks to this, depending on the embodiment of the present Invention and its realization, user's hand or finger are supported by the steering element; they perform convex movements in relation to the sphere of the device; thus compared to other solutions known from the state of related technology, the device according to the present Invention is more precise, less responsive to touch and more comfortable in practical use.

Moreover, if such input pointing device is applied in portable computers, its movement curve involves fewer muscle groups, which makes the steering element movement more ergonomic and less tiring. Actually, only forearm and hand muscles are required to displace the steering element.

To relocate the cursor towards the upper end of the computer screen the nearer edge of the steering element must be pressed down, which automatically lifts the further edge up. It is similar to the movement of human head when one wants to look up, and is analogous to the situation when the cursor is relocated to any other position on the screen.

If the construction parameters are selected properly the area of the sector of possible inclinations corresponds with the area necessary for free access of the cursor to any point all over the computer screen.

It is advantageous that the said bearing be a surface of a spherical shape.

Advantageously, the said bearing may have a form of a rack composed of sections bent in a spherical way.

To reduce friction it is obviously possible to provide the bearings mentioned above with additional ball bearings, or to design the said bearing as a ball bearing.

In yet another advantageous realization, the bearing may have a form of perpendicular mutually connected sliding bearings, of which one is connected to the steering element and the other to the casing.

Furthermore, it is advantageous that the steering element rests freely on the bearing in the casing. Due to this fact, it constitutes a separate element and as such it may be removed e.g. for cleaning purposes. Such design is appropriate especially to stationary computers.

In an alternative design the steering element can be displaced only over the spherical surface defined by the movement of the steering element in relation to the bearing. In such case the steering element is connected to the casing, which prevents it from accidental falling out of bearing's nest. It is advantageous that the said bearing is provided with a hole, whereas the steering element comprises the upper part and protective lower part; the latter prevents the steering element from falling out of the hole, both of which are linked by means of connecting element leading through the hole.

In yet another advantageous realization of the steering element according to the present Invention, the steering element has a hollow space inside and a hole (36) in the lower surface, whereas the casing has a protective upper part, which is linked with the casing by means of connecting element leading through the hole.

In both cases the shape of the hole in either the bearing or the steering element is actually optional. It might be circle-, ellipsis- or square-shaped. However, the shape of the hole determines the possible inclinations surface, which enables its optimal definition—hence greater ergonomics of the device in practical use. For instance, if the steering element has small dimensions and is displaced by user's finger, the acceptable range of its movements may vary in mutually parallel directions.

The steering element may also be advantageously provided with a dome part for user's hand, which makes it possible to rest the hand on the steering element; thus it enhances the comfort and precision of movements.

It is advantageous that the upper surface of the steering element have an ergonomic shape adjusted to the shape of user's hand.

In case of steering element design for portable computers, the upper surface of the steering element may have an ergonomically advantageous shape adjusted to the shape of user's finger.

The steering element movement detector may advantageously have the form of a micro-camera.

Alternative steering element movement detectors may advantageously be provided with a light emitter, whose ray, having been reflected from the steering element, will be read by an optical sensor. In such case it is possible to cover the relevant surface of the steering element with a network of graphic perforations. It enables the device to be more accurate in use than traditional input pointing devices, because such network is situated inside, hence it is not subject to mechanical damage or dirt. Additionally, it allows higher resolution.

In yet another advantageous realization of the device the steering element movement detectors may have a form of a dome and a system of perpendicular rollers.

The input pointing device may also advantageously be provided with repositioning elements which enable the steering element to recover its central position after being relocated.

In a convenient and simple realization the repositioning element has a form of a spring.

It is also advantageous that the device comprise an on/off switch for the steering element movement detector, with a provision that the steering element movement detector is ON while the steering element and the bearing in the casing are being pressed by user's finger or hand. The fact that the pressure exerted on the steering element is relieved leads to switching the movement detector off or ignoring its signals by the computer. This enables the repositioning elements to revert the steering element to its central position without dislocating the cursor on the computer screen. The steering element pressed again will make it possible to move the cursor into a new position further to the previous one. Thanks to this the areas of computer applications situated beyond defined screen surface are accessible, which is especially advantageous in case of graphic or design programs as well as some computer games.

The input pointing device according to the present Invention may comprise as well supporting elements to maintain the steering element's position after its relocation. In many realizations of this Invention such elements will not be necessary due to small curve surface of the bearing.

If the steering element is linked to the casing with a connecting element, such element should preferably be built in a telescope fashion; in segments of the said connecting element there may be supporting elements in the form of an electromagnet (shortening the length of the connecting element) as well as an adversely acting spring. The fact that the pressure exerted by user's hand or finger on the steering element is relieved leads to activation of the electromagnet, shortening the connecting element, and blocking the steering element in its current position. The steering element pressed again will switch off the magnet and the spring will revert the connecting element to its working length, thus enabling the movement of the steering element. In such case, if the input pointing device is permanently fixed to the body of the computer, it will be inevitable for the computer program to redefine the position of the cursor on the computer screen with respect to the current position of the steering element in relation to the bearing.

BRIEF DESCRIPTION OF THE DRAWING

The embodiment of the invention has been represented by practical realization examples in the form of drawings, where:

FIG. 5 is a cross-sectional diagram showing yet another example of input pointing device realization;

FIG. 6 is a diagram showing input pointing device represented by the drawings FIG. 4 and FIG. 5 in axonometric view;

FIG. 11a is a schematic diagram showing a side view of steering element movement surface in the input pointing device according to the present Invention;

FIGS. 11b and 11c are side view schematic diagrams showing the movement surface of steering elements in common input pointing devices, namely lever manipulator and trackball.

DETAILED DESCRIPTION OF THE EMBODIMENTS

Figure 1:
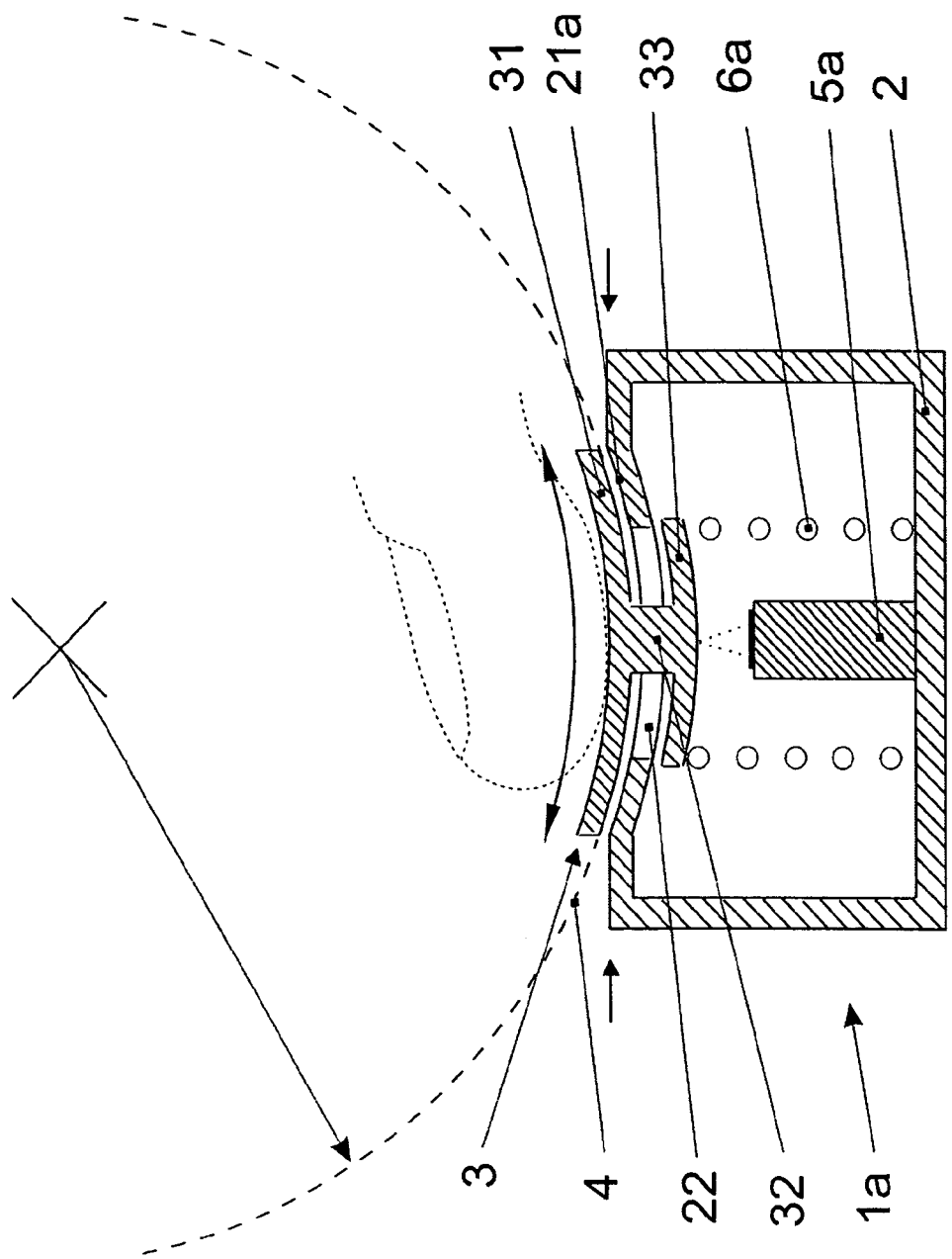
FIG. 1 is a cross-sectional diagram showing the input pointing device according to the present Invention to be applied in portable computers.
Figure 2:
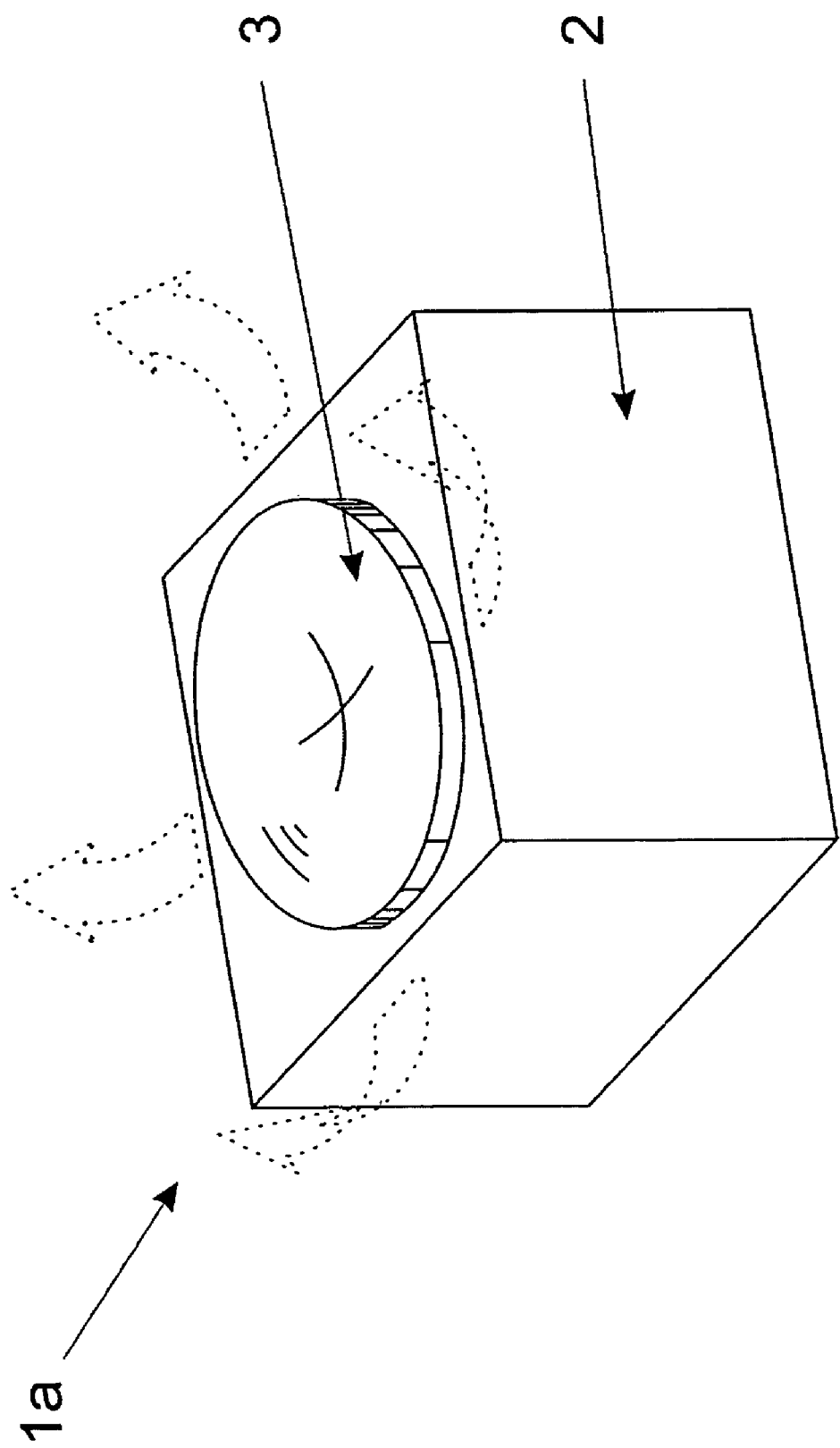
FIG. 2 is a schematic diagram showing the input pointing device displayed in FIG. 1 in axonometric view.

The computer input pointing device 1a shown in diagrams FIG. 1 and FIG. 2 comprises the casing 2 and the movable steering element. The upper part of the casing is concave and forms a spherical bearing 21a for the steering element 3. Moreover, there is a square hole 22 in the bearing 21a. The steering element 3 has been designed as one part composed of three functional elements: upper part 31, whose lower surface has a shape of a sector of the sphere respective to the curve of casing's 2 bearing 21, whereas the upper surface has an ergonomic shape adjusted to schematically displayed user's finger; connecting element 32, leading through the hole 22; and protective lower end 33 which prevents the steering element from falling out of the casing.

The steering element may be relocated on the casing's 2 bearing 21; such movement is performed on a sector of the sphere 4 marked with a dashed line as a circle in the diagram FIG. 1, and is registered with the use of schematically shown optical sensor 5a in the form of a camera. The range of possible inclinations of the steering element 3 is limited by the dimensions of the hole 22, whose shape may be optional, in relation to the surface of the vertical section of the connecting element 32. Moreover, in the casing there is a repositioning element in the form of a spring 6a, whose function is to recover the central position of the steering element after its inclination.

As it is clearly seen, the center of the sphere defined by the movement of the steering element in relation to the casing's bearing is high above the user's finger. It enables a better control of steering element's 3 movement and greater comfort in practical use of input pointing device 1a. Horizontal arrows indicate the placement of the largest secant surface.

In the further part of this description some other examples of input pointing device realization according to the present Invention are shown. In all diagrams numerical footnotes of the elements which serve the same purpose are identical to the diagram FIG. 1.

Figure 3:
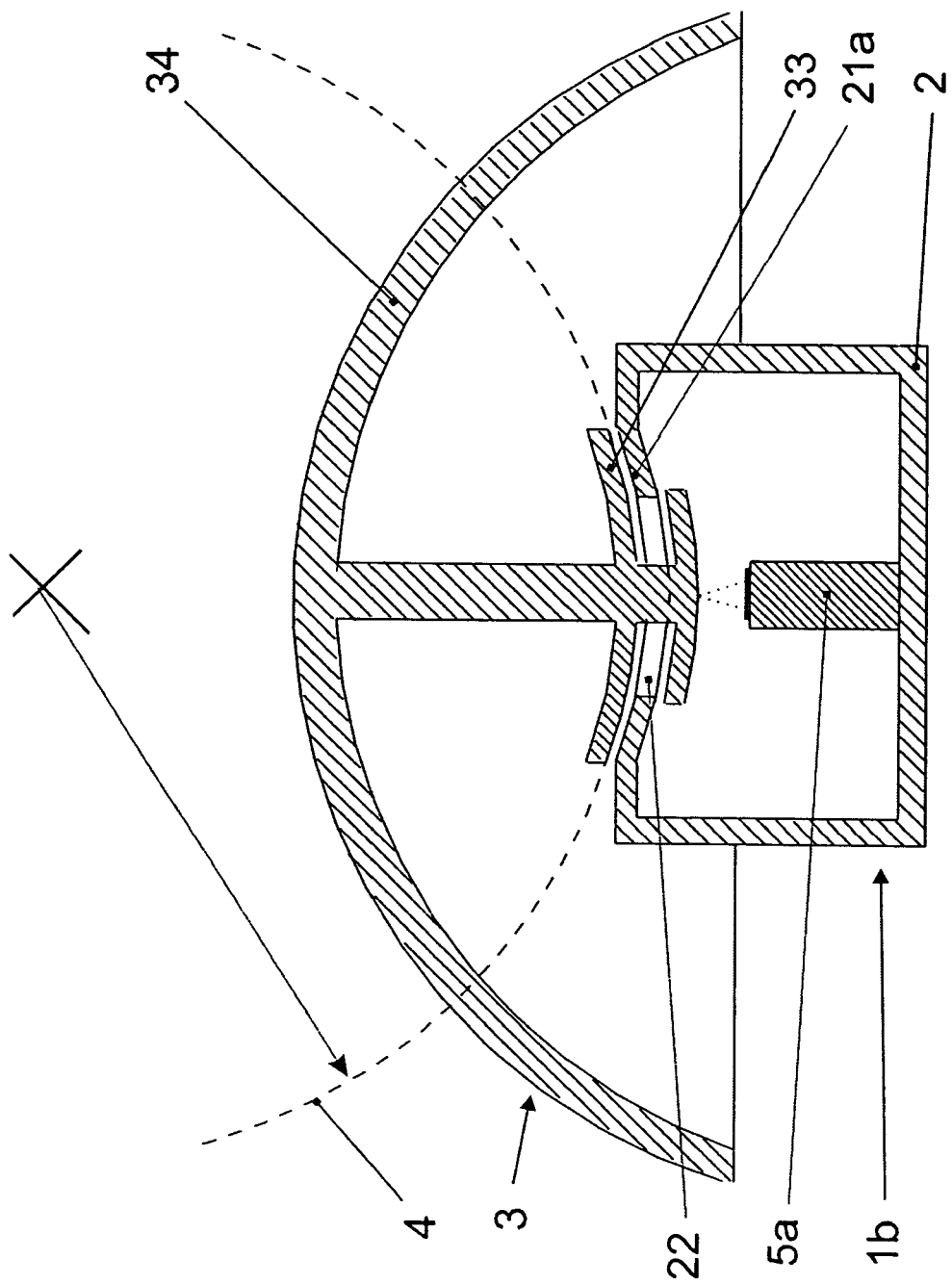
FIG. 3 is a cross-sectional diagram showing another example of input pointing device realization, where a dome part for user's hand has been provided.

The diagram FIG. 3 shows a slightly different example of input pointing device—1b realization, which may be applied in stationary computers. Conversely to the input pointing device shown in diagram FIG. 1, in this version the steering element is provided with a dome part 34 for user's hand. Additionally, in the device 1b there are no repositioning elements, so having been inclined the steering element preserves its position.

Figure 4:
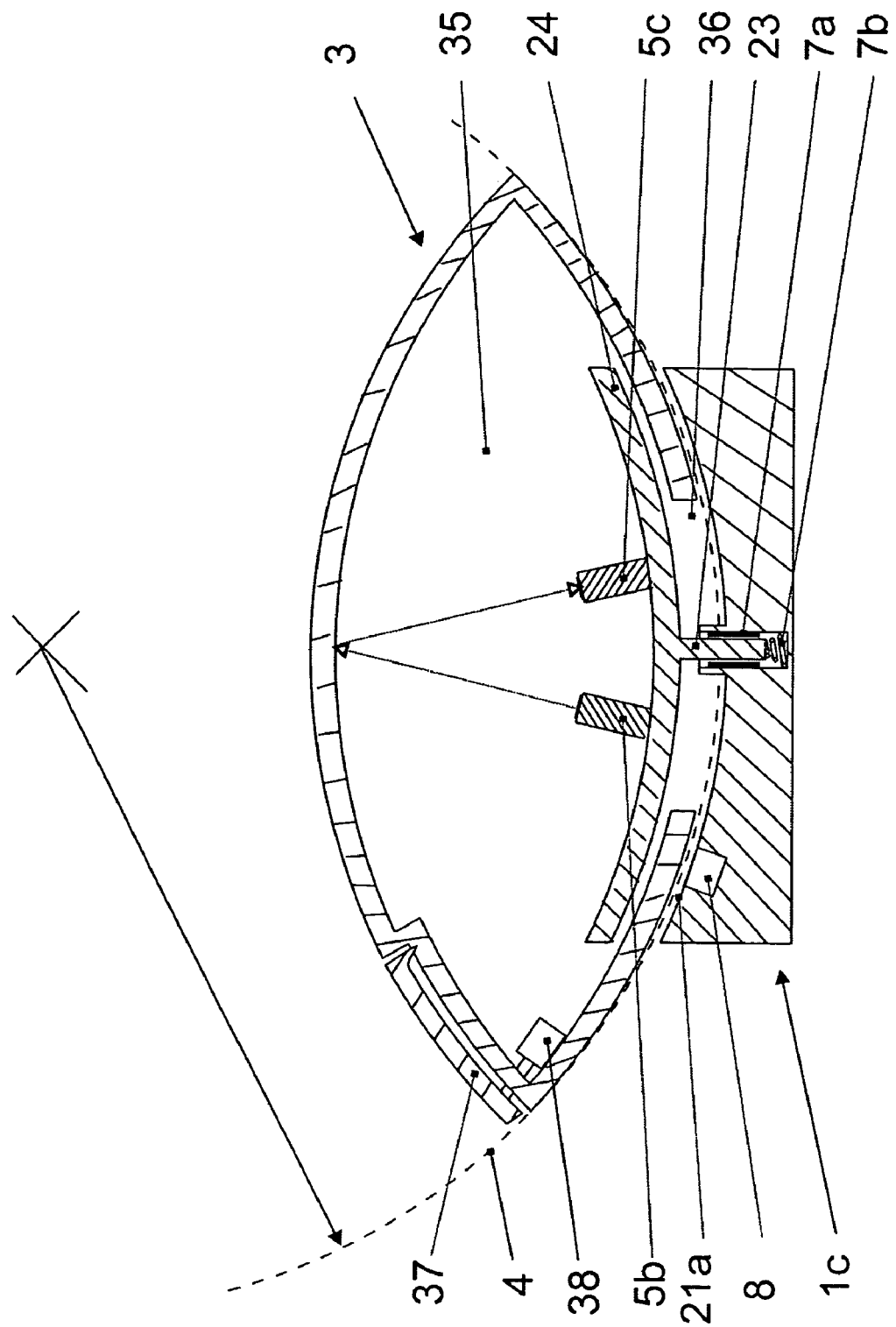
FIG. 4 is a cross-sectional diagram showing yet another example of input pointing device realization according to the present Invention.

In the input pointing device 1c shown in diagram FIG. 4 the steering element has a form of a disk provided with an empty hollow space inside 35. The lower surface of the steering element 3 has a spherical shape—respective to the casing's 2 bearing 21a curve and is provided with a round hole (36). Casing's bearing is linked with it by means of connecting element 23 leading through the hole (36) in the lower surface of the steering element 3, with a protective upper part 24 whose function is to prevent the steering element 3 from falling out of the casing, as it was the case with devices shown in the diagrams FIG. 1, FIG. 2 and FIG. 3.

Movement detectors in the form of light ray emitter 5b and optical sensor 5c have been placed on protective upper part 23. Such ray of light is reflected by the lower surface of the steering element. Additionally, the steering element 3 comprises control buttons 37 integrated with micro-switches. These are connected to the computer by means of an electric wire leading through the connecting element 23 in the casing, which was not displayed in the diagram.

Additionally, the connecting element is built in a telescope fashion, and there are supporting elements in the form of an electromagnet 7a in its segments. The said electromagnet shortens the length of the connecting element and that of the spring 7b. (Such spring reacts all the time in opposite direction.) In the casing's bearing 21a there is a micro-switch 8 which stops the emitter's 5b ray of light and activates the electromagnet 7a once the pressure exerted by user's hand on the steering element is relieved. Activating the electromagnet means folding in and shortening the connecting element's length and blocking the steering element in its current position. A new pressure exerted on the steering element 3 is registered by the micro-switch 8 which deactivates the electromagnet 7a. In that moment due to the reaction of the spring 7b the connecting element becomes longer which enables free movement of the steering element 3 on the bearing 21a.

The diagram FIG. 5 shows another embodiment of the input pointing device—1d, where the steering element 3 has a form of a uniform and quite massive disk equipped with control buttons 37 and upper surface of ergonomic shape adjusted to user's hand. The steering element rests freely on a ball bearing 21b. The element of movement detection in such case comprises a ball 5d linked with a system of perpendicular rollers 5e schematically represented in the diagram. The idea of such system is similar to detection devices applied in a common computer mouse.

The fact that the steering element rests freely on the casing makes it possible to remove it in order to e.g. clean bearing's balls 21b or the ball of the detection system 5e.

The diagram FIG. 6 shows the axonometric view of the input pointing device 1d from the diagram FIG. 5 as well as the axonometric view of input pointing device 1c shown in diagram FIG. 4.

Figure 7:
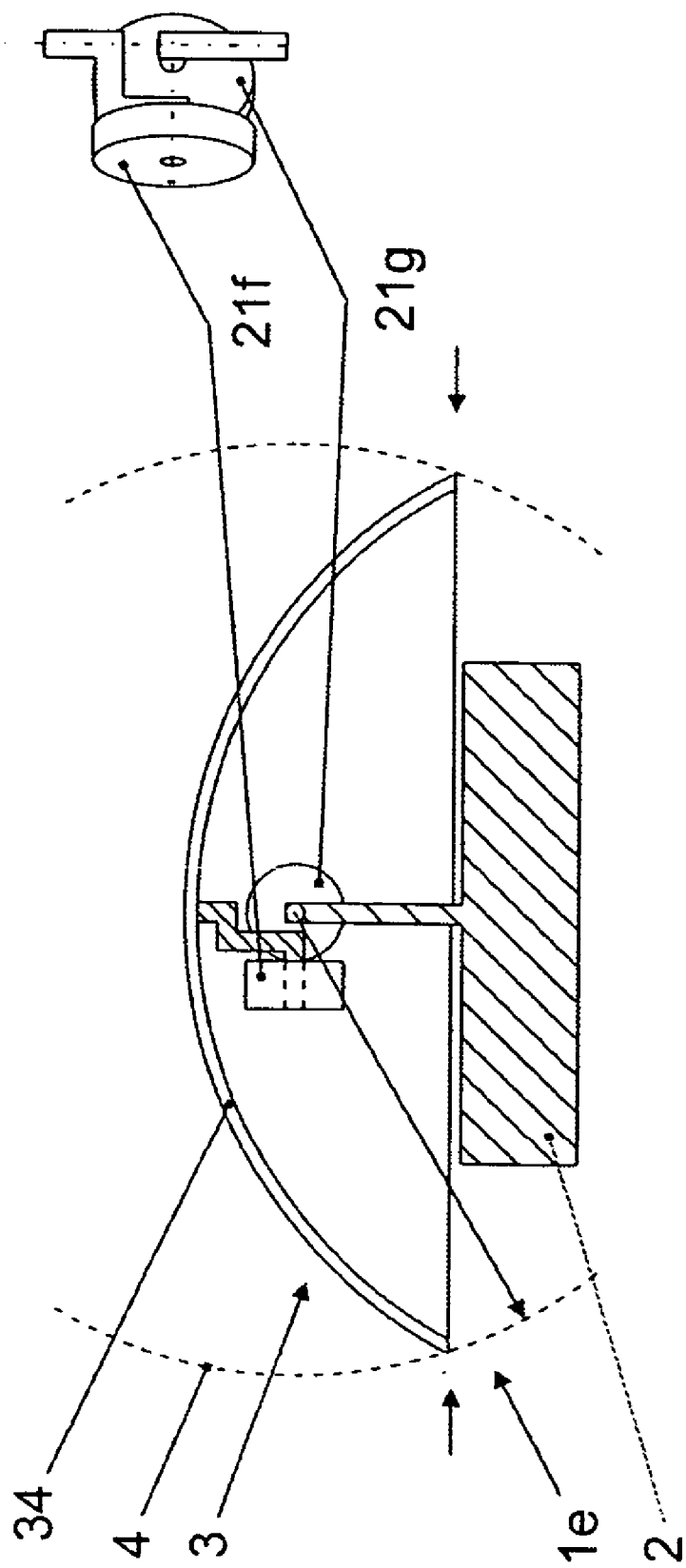
FIG. 7 is a cross-sectional diagram showing yet another example of input pointing device realization according to the present Invention; with details referring to bearing construction.

The diagram FIG. 7 shows input pointing device 1e, in which a bearing has the form of flat mutually connected perpendicular sliding bearings 21f and 21g has been applied. The bearing 21g is rotary connected to the casing 2 of the steering element by its shank. Conversely the shank of the bearing 21f is connected to the dome part 34 of the steering element 3. The intersection point of bearings 21g and 21f determines the center of steering element 3 possible movement sphere in relation to the casing's 2 bearing 21. The arrows show the placement of the largest horizontal secant surface.

Figure 8:
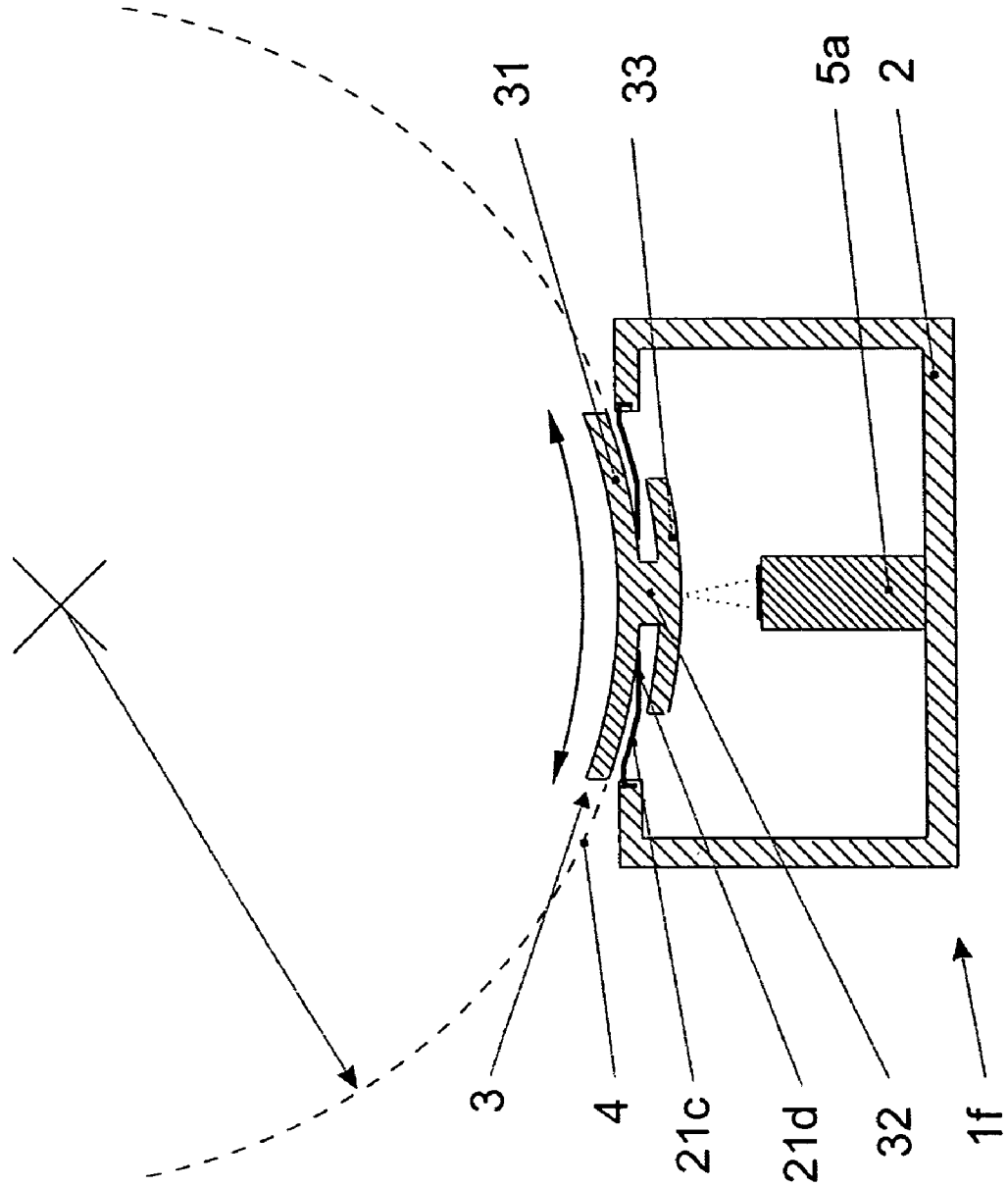
FIG. 8 is a cross-sectional diagram showing yet another example of input pointing device realization according to the present Invention.
Figure 9:
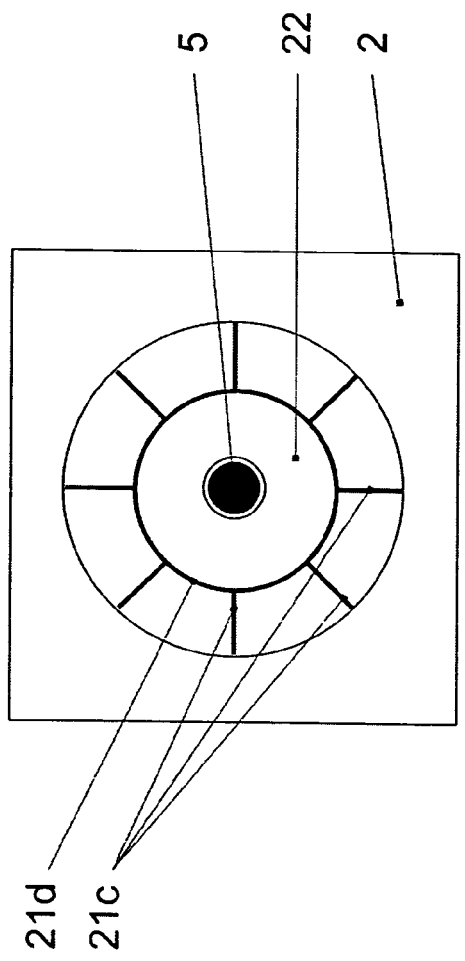
FIG. 9 shows the input pointing device as seen from above after the steering element has been removed.
Figure 10:
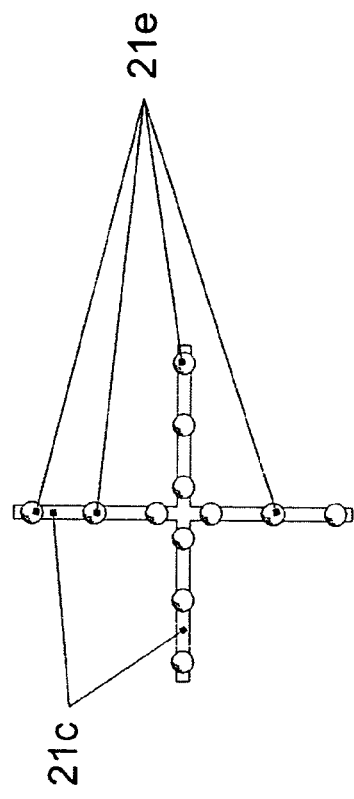
FIG. 10 is a schematic diagram showing an example the steering element bearing realization.

The diagram FIG. 8 shows yet another embodiment of the input pointing device—1f, where the bearing in the form of a rack composed of spherically bent sections 21c has been applied. The diagram FIG. 9 shows the device 1f as seen from above after the steering element has been removed. In such case eight shapes 21c have been used. They were placed at 45 degree mutually equal angles. One end of each shape 21c is attached to casing's 2 edges. All shapes at the other end converge in a radial way into a circle 21d. The shapes 21c define the spherical surface 4 of the steering element movement. Although the device 1e constitutes a variation of the device 1a from diagram FIG. 1, because the movement of the steering element is possible only within the area of the hole 22 limited by the circle 21d, it is obviously possible to produce a rake without the inner circle 21d. An example of such a bearing is shown on diagram FIG. 10. To reduce friction such bearing has been provided with additional balls 21e whose nests are situated in upper surfaces of the shapes 21c.

Figure 11C:
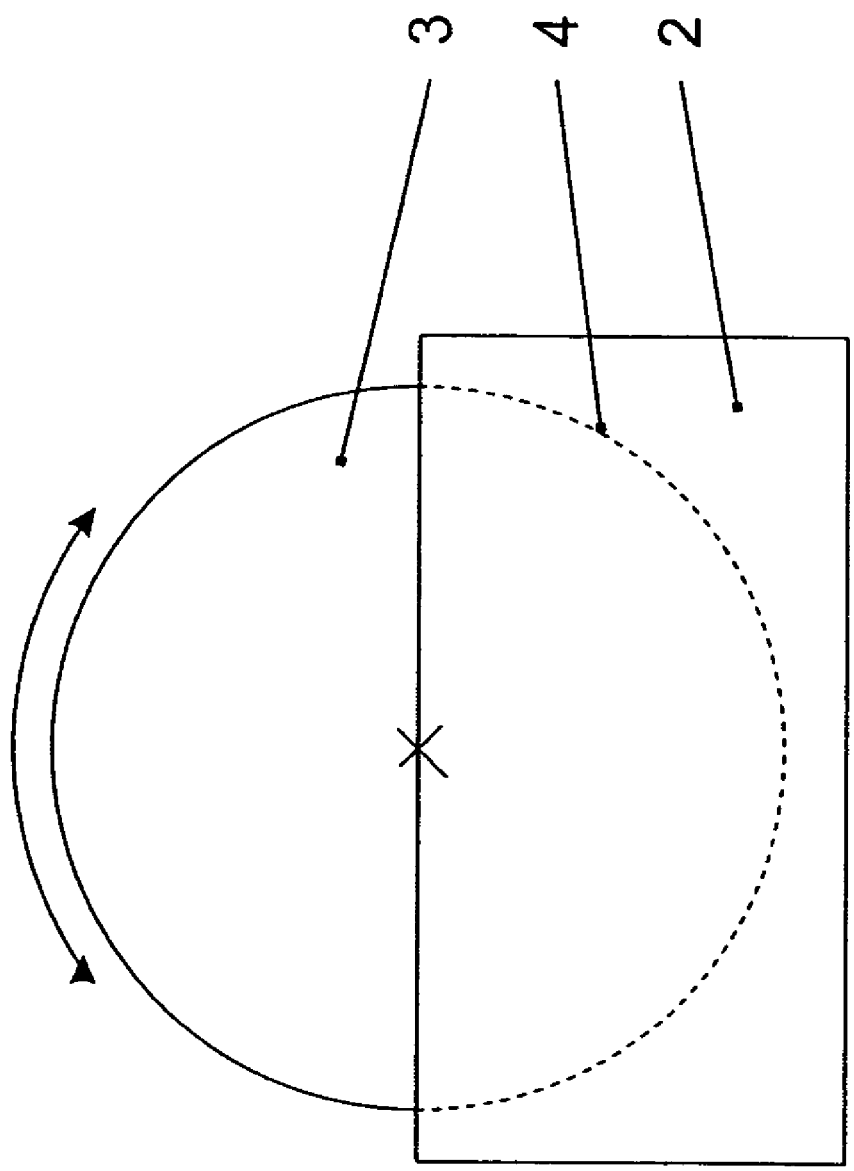

The diagram FIG. 11 shows in a schematic way the sphere 4, whose sector represents the area of possible inclinations of the steering element 3 in the input pointing device according to the present Invention (diagram FIG. 11a) as well as two other common input pointing devices according to the state of related technology: lever manipulator (joystick or trackpoint, diagram FIG. 11b) and trackball (diagram FIG. 11c). The difference in the position of sphere centers in each device is clearly seen. In the device shown in diagram FIG. 11b such center is situated at the bottom of the steering lever; in the trackball device it is placed in the center of the steering element, whereas in the device according to the present Invention—much above the steering element.

The descriptions of possible embodiments of input pointing device according to the present Invention mentioned above are only for the purposes of illustration, and are not intended to limit the scope of protection accorded this Invention. Anyone keen on technology is able to provide various modifications, especially those referring to the construction of casing's bearing or steering element movement detection means, which will not be excluded from the scope of protection restricted in patent claims here above.

I claim:

1. A computer input pointing device which comprises a casing, an upper movable steering element, steering element's movement detector, and the system transmitting information about such movement to the computer, wherein the steering element (3) is connected to the casing (2) by a connection allowing two dimensional spherical movement, while the center of the spherical surface (4) defined by the movement of the steering element (3) in relation to the casing (2) is situated above the steering element (3), wherein said connection has a form of perpendicular, mutually connected flat rolling or sliding bearings (21f, 21g), of which one (21f) is connected to the steering element (3) and the other (21g) to the casing of the input pointing device (1e).

2. A computer input pointing device which comprises a casing, an upper movable steering element, steering element's movement detector, and the system transmitting information about such movement to the computer, wherein the steering element (3) is connected to the casing (2) by a connection allowing two dimensional spherical movement, while the center of the spherical surface (4) defined by the movement of the steering element (3) in relation to the casing is situated above the steering element (3), wherein the steering element (3) has a possibility of relocation only over the spherical surface defined by the movement of the steering element (3) in relation to the casing (2), wherein the steering element (3) has a hollow space inside (35) and a hole (36) in the lower surface, whereas the casing (2) has a protective upper part (24) which prevents the steering element (3) from being disconnected and which is linked with the casing (2) by means of a connecting element (23) leading through the hole (36).

3. A computer input pointing device which comprises a lower disposed casing, an upper movable steering element, steering element's movement detector, and the system transmitting information about such movement to the computer, wherein the steering element (3) is connected to the casing (2) by a connection allowing two dimensional spherical movement, while the center of the spherical surface (4) defined by the movement of the steering element (3) in relation to the casing (2) is situated above the steering element (3);

wherein the steering element (3) movement detector has a form of a dome (5d) and a system of perpendicular rollers (5e).

4. A computer input pointing device which comprises a casing, an upper movable steering element, steering element's movement detector, and the system transmitting information about such movement to the computer, wherein the steering element (3) is connected to the casing (2) by a connection allowing two dimensional spherical movement, while the center of the spherical surface (4) defined by the movement of the steering element (3) in relation to the casing is situated above the steering element (3), wherein the computer input pointing device comprises supporting elements to maintain the steering element's (3) position after relocation, with a provision that the connecting element (23, 32) is built in a telescope fashion and the supporting elements comprise an electromagnet (7a) shortening the length of the connecting element as well as that of an adversely acting spring (7b), both of which are situated in the segments of the connecting element (23, 32).

* * * * *